(12) United States Patent
Gurman

(10) Patent No.: US 9,019,267 B2
(45) Date of Patent: Apr. 28, 2015

(54) DEPTH MAPPING WITH ENHANCED RESOLUTION

(71) Applicant: Primesense Ltd., Tel Aviv (IL)

(72) Inventor: Amiad Gurman, D.N Efrayim (IL)

(73) Assignee: Apple Inc., Cupertino, CA (US)

( * ) Notice: Subject to any disclaimer, the term of this patent is extended or adjusted under 35 U.S.C. 154(b) by 226 days.

(21) Appl. No.: 13/663,518

(22) Filed: Oct. 30, 2012

(65) Prior Publication Data

US 2014/0118335 A1    May 1, 2014

(51) Int. Cl.

| G06T 15/00 | (2011.01) |
|---|---|
| G06T 7/00 | (2006.01) |
| G06K 9/00 | (2006.01) |
| G06K 9/46 | (2006.01) |
| G06T 15/30 | (2011.01) |

(52) U.S. Cl.
CPC .............. *G06T 7/0057* (2013.01); *G06T 15/30* (2013.01); *G06T 7/0083* (2013.01); *G06T 7/0093* (2013.01); *G06T 2207/20144* (2013.01); *G06K 9/00382* (2013.01); *G06K 9/469* (2013.01)

(58) Field of Classification Search
None
See application file for complete search history.

(56) References Cited

U.S. PATENT DOCUMENTS

| 5,684,887 A | 11/1997 | Lee et al. |
|---|---|---|
| 5,846,134 A | 12/1998 | Latypov |
| 5,852,672 A | 12/1998 | Lu |
| 5,862,256 A | 1/1999 | Zetts et al. |
| 5,864,635 A | 1/1999 | Zetts et al. |
| 5,870,196 A | 2/1999 | Lulli et al. |
| 6,002,808 A | 12/1999 | Freeman |
| 6,176,782 B1 | 1/2001 | Lyons et al. |
| 6,256,033 B1 | 7/2001 | Nguyen |
| 6,658,136 B1 | 12/2003 | Brumitt |
| 6,681,031 B2 | 1/2004 | Cohen et al. |
| 6,771,818 B1 | 8/2004 | Krumm et al. |
| 6,857,746 B2 | 2/2005 | Dyner |
| 7,003,134 B1 | 2/2006 | Covell et al. |
| 7,003,136 B1 | 2/2006 | Harville |
| 7,013,046 B2 | 3/2006 | Kawamura et al. |
| 7,042,440 B2 | 5/2006 | Pryor et al. |
| 7,170,492 B2 | 1/2007 | Bell |

(Continued)

FOREIGN PATENT DOCUMENTS

| JP | H03-029806 A | 2/1991 |
|---|---|---|
| JP | H10-235584 A | 9/1998 |

(Continued)

OTHER PUBLICATIONS

Primsense Inc., "Prime Sensor™ NITE 1.1 Framework Programmer's Guide", Version 1.2, 2009.

(Continued)

*Primary Examiner* — Said Broome
(74) *Attorney, Agent, or Firm* — D. Kilgler J. P. Services Ltd.

(57) ABSTRACT

A method for depth mapping includes receiving an image of a pattern of spots that has been projected onto a scene, which includes a feature having a set of elongate appendages, which have respective transverse dimensions that are less than twice an average distance between the spots in the pattern that is projected onto the feature. The image is processed in order to segment and find a three-dimensional (3D) location of the feature. The spots appearing on the feature in the 3D location are connected in order to extract separate, respective contours of the appendages.

33 Claims, 8 Drawing Sheets

(56) References Cited

U.S. PATENT DOCUMENTS

| | | |
|---|---|---|
| 7,215,815 B2 | 5/2007 | Honda |
| 7,259,747 B2 | 8/2007 | Bell |
| 7,302,099 B2 | 11/2007 | Zhang et al. |
| 7,317,830 B1 | 1/2008 | Gordon et al. |
| 7,340,077 B2 | 3/2008 | Gokturk |
| 7,348,963 B2 | 3/2008 | Bell |
| 7,428,542 B1 | 9/2008 | Fink et al. |
| 7,536,032 B2 | 5/2009 | Bell |
| 7,555,158 B2 | 6/2009 | Park et al. |
| 7,580,572 B2 | 8/2009 | Bang et al. |
| 7,583,275 B2 | 9/2009 | Neumann et al. |
| 7,925,077 B2 | 4/2011 | Woodfill et al. |
| 8,175,374 B2 | 5/2012 | Pinault et al. |
| 8,249,334 B2 | 8/2012 | Berliner et al. |
| 8,280,106 B2 | 10/2012 | Ma |
| 8,320,621 B2 | 11/2012 | McEldowney |
| 8,358,342 B2 | 1/2013 | Park |
| 8,379,926 B2 | 2/2013 | Kanhere et al. |
| 8,405,656 B2 | 3/2013 | El Dokor et al. |
| 8,411,149 B2 | 4/2013 | Maison et al. |
| 8,411,932 B2 | 4/2013 | Liu et al. |
| 8,503,720 B2 | 8/2013 | Shotton et al. |
| 2002/0071607 A1 | 6/2002 | Kawamura et al. |
| 2003/0095698 A1 | 5/2003 | Kawano |
| 2003/0156756 A1 | 8/2003 | Gokturk et al. |
| 2003/0235341 A1 | 12/2003 | Gokturk et al. |
| 2004/0091153 A1 | 5/2004 | Nakano et al. |
| 2004/0183775 A1 | 9/2004 | Bell |
| 2004/0184640 A1 | 9/2004 | Bang et al. |
| 2004/0184659 A1 | 9/2004 | Bang et al. |
| 2004/0258306 A1 | 12/2004 | Hashimoto |
| 2005/0031166 A1 | 2/2005 | Fujimura et al. |
| 2005/0088407 A1 | 4/2005 | Bell et al. |
| 2005/0089194 A1 | 4/2005 | Bell |
| 2005/0265583 A1 | 12/2005 | Covell et al. |
| 2005/0271279 A1 | 12/2005 | Fujimura et al. |
| 2006/0092138 A1 | 5/2006 | Kim et al. |
| 2006/0115155 A1 | 6/2006 | Lui et al. |
| 2006/0159344 A1 | 7/2006 | Shao et al. |
| 2007/0003141 A1 | 1/2007 | Rittscher et al. |
| 2007/0076016 A1 | 4/2007 | Agarwala et al. |
| 2007/0154116 A1 | 7/2007 | Shieh |
| 2007/0230789 A1 | 10/2007 | Chang et al. |
| 2008/0123940 A1 | 5/2008 | Kundu et al. |
| 2008/0226172 A1 | 9/2008 | Connell |
| 2008/0236902 A1 | 10/2008 | Imaizumi |
| 2008/0252596 A1 | 10/2008 | Bell et al. |
| 2008/0260250 A1 | 10/2008 | Vardi |
| 2008/0267458 A1 | 10/2008 | Laganiere et al. |
| 2008/0310706 A1 | 12/2008 | Asatani et al. |
| 2009/0009593 A1 | 1/2009 | Cameron et al. |
| 2009/0027335 A1 | 1/2009 | Ye |
| 2009/0078473 A1 | 3/2009 | Overgard et al. |
| 2009/0083622 A1 | 3/2009 | Chien et al. |
| 2009/0096783 A1 | 4/2009 | Shpunt et al. |
| 2009/0116728 A1 | 5/2009 | Agrawal et al. |
| 2009/0183125 A1 | 7/2009 | Magal et al. |
| 2009/0222388 A1 | 9/2009 | Hua et al. |
| 2009/0297028 A1 | 12/2009 | De Haan |
| 2010/0002936 A1 | 1/2010 | Khomo |
| 2010/0007717 A1 | 1/2010 | Spektor et al. |
| 2010/0034457 A1* | 2/2010 | Berliner et al. ............... 382/154 |
| 2010/0111370 A1 | 5/2010 | Black et al. |
| 2010/0235786 A1 | 9/2010 | Maizels et al. |
| 2010/0302138 A1 | 12/2010 | Poot et al. |
| 2010/0303289 A1 | 12/2010 | Polzin et al. |
| 2010/0322516 A1 | 12/2010 | Xu et al. |
| 2011/0025689 A1 | 2/2011 | Perez et al. |
| 2011/0052006 A1* | 3/2011 | Gurman et al. ............... 382/103 |
| 2011/0164032 A1 | 7/2011 | Shadmi et al. |
| 2011/0182477 A1 | 7/2011 | Tamrakar et al. |
| 2011/0211754 A1 | 9/2011 | Litvak et al. |
| 2011/0237324 A1 | 9/2011 | Clavin et al. |
| 2011/0292036 A1 | 12/2011 | Sali et al. |
| 2011/0293137 A1 | 12/2011 | Gurman et al. |
| 2012/0070070 A1 | 3/2012 | Litvak |

FOREIGN PATENT DOCUMENTS

| | | |
|---|---|---|
| WO | 9935633 A2 | 7/1999 |
| WO | 03071410 A2 | 8/2003 |
| WO | 2004107272 A1 | 12/2004 |
| WO | 2005003948 A1 | 1/2005 |
| WO | 2005094958 A2 | 10/2005 |
| WO | 2007043036 | 4/2007 |
| WO | 2007078639 A2 | 7/2007 |
| WO | 2007105205 A2 | 9/2007 |
| WO | 2007132451 A2 | 11/2007 |
| WO | 2007135376 A2 | 11/2007 |
| WO | 2008120217 A2 | 10/2008 |
| WO | 2010004542 A1 | 1/2010 |

OTHER PUBLICATIONS

Luxand Inc., "Luxand FaceSDK 3.0 Face Detection and Recognition Library Developer's Guide" years 2005-2010.

Intel Corporation, "Open Source Computer Vision Library Reference Manual", years 1999-2001.

Arya et al., "An Optimal Algorithm for Approximate Nearest Neighbor Searching in Fixed Dimensions", Association for Computing Machinery Journal, vol. 45, issue 6, pp. 891-923, New York, USA, Nov. 1998.

Muja et al., "Fast Approximate Nearest Neighbors with Automatic Algorithm Configuration", International Conference on Computer Vision Theory and Applicatons, pp. 331-340, Lisboa, Portugal, Feb. 5-8, 2009.

Mori et al., "Estimating Human Body Configurations Using Shape Context Matching", Proceedings of the European Conference on Computer Vision, vol. 3, pp. 666-680, Copenhagen, Denmark, May 27-Jun. 2, 2002.

Agarwal et al., "Monocular Human Motion Capture with a Mixture of Regressors", Proceedings of the 2004 IEEE Conference on Computer Vision and Pattern Recognition, San Diego, USA, Jun. 20-26, 2005.

Lv et al., "Single View Human Action Recognition Using Key Pose Matching and Viterbi Path Searching", Proceedings of IEEE Conference on Computer Vision and Pattern Recognition, Minneapolis, USA, Jun. 17-22, 2007.

Munoz-Salinas et al., "People Detection and Tracking Using Stereo Vision and Color", Image and Vision Computing, vol. 25, No. 6, pp. 995-1007, Jun. 1, 2007.

Bradski, G., "Computer Vision Face Tracking for Use in a Perceptual User Interface", Intel Technology Journal, vol. 2, issue 2 (2nd Quarter 2008).

Kaewtrakulpong et al., "An Improved Adaptive Background Mixture Model for Real-Time Tracking with Shadow Detection", Proceedings of the 2nd European Workshop on Advanced Video Based Surveillance Systems (AVBS'01), Kingston, UK, Sep. 2001.

Kolsch et al., "Fast 2D Hand Tracking with Flocks of Features and Multi-Cue Integration", IEEE Workshop on Real-Time Vision for Human Computer Interaction (at CVPR'04), Washington, USA, Jun. 27-Jul. 2, 2004.

Shi et al., "Good Features to Track", IEEE Conrference on Computer Vision and Pattern Recognition, pp. 593-600, Seattle, USA, Jun. 21-23, 1994.

Vosselman et al., "3D Building Model Reconstruction From Point Clouds and Ground Plans", International Archives of Photogrammetry and Remote Sensing, vol. XXXIV-3/W4, pp. 37-43, Annapolis, USA, Oct. 22-24, 2001.

Submuth et al., "Ridge Based Curve and Surface Reconstruction", Eurographics Symposium on Geometry Processing, Barcelona, Spain, Jul. 4-6, 2007.

Fergus et al., "Object Class Recognition by Unsupervised Scale-Invariant Learning", Proceedings of the IEEE Conference on Computer Vision and Pattern Recognition, vol. 2, pp. 264-271, Jun. 18-20, 2003.

(56) References Cited

OTHER PUBLICATIONS

Cohen et al., "Interference of Human Postures by Classification of 3D Human Body Shape", IEEE International Workshop on Analysis and Modeling of Faces and Gestures, ICCV 2003, Nice, France, Oct. 14-17, 2003.
Agarwal et al., "3D Human Pose from Silhouettes by Relevance Vector Regression", Proceedings of the IEEE Conference on Computer Vision and Pattern Recognition, vol. 2, pp. 882-888, Jun. 27 -Jul. 2, 2004.
Borenstein et al., "Combining Top-down and Bottom-up Segmentation", Proceedings of th IEEE Conference on Computer Vision and Pattern Recognition, Jun. 27-Jul. 2, 2004.
Karlinsky et al., "Combined Model for Detecting, Localizing, Interpreting and Recognizing Faces", Faces in Real-Life Images workshop, European Conference on Computer Vision, France, Oct. 12-18, 2008.
Ullman, S., "Object Recognition and Segmentation by a Fragmen-Based Hierarchy", Trends in Cognitive Sciences, vol. 11, No. 2, pp. 58-64, Feb. 2007.
Shakhnarovich et al., "Fast Pose Estimation with Parameter Sensitive Hashing", Proceedings of the 9th IEEE International Conference on Computer Vision (ICCV 2003), pp. 750-759, Nice, France, Oct. 14-17, 2003.
Ramanan et al., "Training Deforniable Models for Localization", Proceedings of the 2006 IEEE Conference on Computer Vision and Pattern Recognition, pp. 206-213, New York, USA, Jun. 17-22, 2006.
Ramanan, D., "Learning to Parse Images of Articulated Bodies", Neural Information Processing Systems Foundation year 2006.
Jiang H., "Human Pose Estimation Using Consistent Max-Covering", 12th IEEE International Conference on Computer Vision, Kyoto, Japan, Sep. 27-Oct. 4, 2009.
Shotton et al., "Real-Time Human Pose Recognition in Parts from Single Depth Images", 24th IEEE Conference on Computer Vision and Pattern Recognition, Colorado Springs, USA, Jun. 20-25, 2011.
Rodgers et al., "Object Pose Detection in Range Scan Data", IEEE Conference on Computer Vision and Pattern Recognition, pp. 2445-2452, New York, USA, Jun. 17-22, 2006.
U.S. Appl. No. 12/854,188 Official Action dated Nov. 26, 2012.
U.S. Appl. No. 12/300,086 Official Action dated Jan. 17, 2012.
Litvak et al., U.S. Appl. No. 13/786,508, filed Mar. 6, 2013.
Gurman et al., U.S. Appl. No. 13/461,802, filed May 2, 2012.
U.S. Appl. No. 13/229,727 Office Action dated Mar. 13, 2013.
U.S. Appl. No. 12/854,187 Office Action dated Apr. 19, 2013.
Grzeszczuk et al., "Stereo based gesture recognition invariant for 3D pose and lighting", Proceedings of IEEE Conference on Computer Vision and Pattern Recognition, vol. 1, pp. 826-833, Jun. 13-15, 2000.
Li et al., "Statistical modeling of complex backgrounds for foreground object detection", IEEE Transactions on Image Processing, vol. 13, No. 11,pp. 1459-1472, Nov. 2004.
Ren et al., "Real-time modeling of 3-D soccer ball trajectories from multiple fixed cameras", IEEE Transactions on Circuits and Systems for Video Technology, vol. 18, No. 3, pp. 350-362, Mar. 2008.
U.S. Appl. No. 13/867,083 Office Action dated Oct. 23, 2013.
U.S. Appl. No. 13/867,085 Office Action dated Nov. 7, 2013.
Krumm et al., "Multi-camera multi person tracking for EasyLiving"., Visual surveillance, 2000, Proceedings, Third International workshop pp. 1-8, 2000.
Yous et al., "People detection and tracking with World-Z map from single stereo camera"., Visual surveillance, 2008, Eighth International workshop , pp. 1-8, 2008.
Damen et al., "Detecting carried objects in short video sequences", ECCV , School of computing, University of Leeds, pp. 1-14, 2008.
Ran et al., "Multi moving people detection from binocular sequences", Center for Automation Research Institute of Advanced Computer Studies, University of Maryland, pp. 1-4, 2003.
Balcells et al., "An appearance—based approach for consistent labeling of humans and objects in video", Pattern Analysis and Application, pp. 373-385, 2004.
Cucchiara et al., "Track- based and object-based occlusion for people tracking refinement indoor surveillance", VSSN, pp. 1-7, 2004.
Ess et al., "Improved multi- person tracking with active occlusion handling" ICRA workshop of people Detection and tracking, pp. 1-6. 2009.
Hart, D., U.S. Appl. No. 09/616,606, filed Jul. 14, 2000.
International Application PCT/IL2007/000306 Search Report dated Oct. 2, 2008.
Gesturetek Inc., Consumer Electronics Solutions, "Gestures Control Solutions for Consumer Devices", www.gesturetek.com, Toronto, Ontario, Canada, 2009.
International Application PCT/IL2006/000335 Preliminary Report on Patentability dated Apr. 24, 2008.
Avidan et al., "Trajectory triangulation: 3D reconstruction of moving points from amonocular image sequence", PAMI, vol. 22, No. 4, pp. 348-357, Apr. 2000.
Leclerc et al., "The direct computation of height from shading", IEEE Conference on Computer Vision and Pattern Recognition, p. 552-558, Jun. 3-7, 1991.
Zhang et al., "Shape from intensity gradient", IEEE Transactions of Systems, Man, amd Cybernetics—Part A: Systems and Humans, vol. 29, No. 3, pp. 318-325, May 1999.
Zhang et al., "Height recovery from intensity gradients"° IEEE Conference on Computer Vision and Pattern Recognition, pp. 508-513, Jun. 20-24, 1994.
Horn, B., "Height and gradient from shading", International Journal of Computer Vision , vol. 5, No. 1, pp. 37-75. Aug. 1990.
Bruckstein, A., "On Shape from Shading", Computer Vision, Graphics, and Image Processing Journal, vol. 44. issue 2. pp. 139-154, Nov. 1988.
Zhang et al., "Rapid Shape Acquisition Using Color Structured Light and Multi-Pass Dynamic Programming", 1st International Symposium on 3D Data Processing Visualization and Transmission (3DPVT), Padova, Italy, Jun. 19-21, 2002.
Besl, P., "Active Optical Range Imaging Sensors", Journal Machine Vision and Applications, vol. 1, issue 2, pp. 127-152, Apr. 1988.
Horn et al., "Toward optimal structured light patterns", Proceedings of International Conference on Recent Advances in 3D Digital Imaging and Modeling, pp. 28-37, Ottawa, Canada, May 1997.
Goodman, J.W., "Statistical Properties of Laser Speckle Patterns", Laser Speckle and Related Phenomena, pp. 9-75, Springer-Verlag, Berlin Heidelberg, 1975.
Asada et al., "Determining Surface Orientation by Projecting a Stripe Pattern", IEEE Transactions on Pattern Analysis and Machine Intelligence, vol. 10, No. 5, pp. 749-754 Sep. 1988.
Winkelbach et al., "Shape from Single Stripe Pattern Illumination", Luc Van Gool (Editor), (DAGM 2002) Patter Recognition, Lecture Notes in Computer Science 2449, p. 240-247, Springer 2002.
Koninckx et al., "Efficient, Active 3D Acquisition, based on a Pattern-Specific Snake", Luc Van Cool (Editor), (DAGM 2002) Pattern Recognition, Lecture Notes in Computer Science 2449, pp. 557-565, Springer 2002.
Kimmel et al., Analyzing and synthesizing images by evolving curves with the Osher-Sethian method, International Journal of Computer Vision, vol. 24, issue 1, pp. 37-55, Aug. 1997.
Zigelman et al., "Texture mapping using surface flattening via multi-dimensional scaling", IEEE Transactions on Visualization and Computer Graphics, vol. 8, issue 2, pp. 198-207, Apr.-Jun. 2002.
Dainty, J.C., "Introduction", Laser Speckle and Related Phenomena, pp. 1-7, Springer-Verlag, Berlin Heidelberg, 1975.
Mendlovic, et al., "Composite harmonic filters for scale, projection and shift invariant pattern recognition", Applied Optics Journal, vol. 34, No. 2, pp. 310-316, Jan. 10, 1995.
Fua et al., "Human Shape and Motion Recovery Using Animation Models", 19th Congress, International Society for Photogrammetry and Remote Sensing, Amsterdam, The Netherlands, Jul. 2000.
Allard et al., "Marker-less Real Time 3D modeling for Virtual Reality" Immersive Proiection Technology, Iowa State University, IPT 2004.
Howe et al., "Bayesian Reconstruction of 3D Human Motion from Single-Camera Video", Advances in Neural Information Processing Systems 12, Denver, USA, 1999.
Maizels et al., U.S. Appl. No. 61/429,767, filed Jan. 5, 2011.

(56) References Cited

OTHER PUBLICATIONS

Grammalidis et al., "3-D Human Body Tracking from Depth Images Using Analysis by Synthesis", Proceedings of the IEEE International Conference on Image Processing (ICIP2001), pp. 185-188, Thessaloniki, Greece, Oct. 7-10, 2001.

International Application PCT/IL2007/000574 Search Report dated Sep. 10, 2008.

Softkinetic S.A., "3D Gesture Recognition Platform for Developers of 3D Applications", Product Datasheet, IISU™, www.softkinetic-optrima.com, Belgium, 2007-2010.

Li et al., "Real-Time 3D MotionTracking with Known Geometric Models", Real-Time Imaging Journal. vol. 5, pp. 167-187, Academic Press 1999.

Segen et al., "Shadow gestures: 3D hand pose estimation using a single camera", Proceedings of IEEE International Conference on Computer Vision and Pattern Recognition, pp. 479-485, Fort Collins, USA, Jun. 23-25, 1999.

Vogler et al., "ASL recognition based on a coupling between HMMs and 3D motion analysis", Proceedings of IEEE International Conference on Computer Vision, pp. 363-369, Mumbai, India, Jan. 4-7, 1998.

Gionis et al., "Similarity Search in High Dimensions via Hashing", Proceedings of the 25th Very Large Database (VLDB) Conference, Edinburgh, UK, Sep. 7-10, 1999.

Bleiweiss et al., "Markerless Motion Capture Using a Single Depth Sensor", SIGGRAPH Asia 2009, Yokohama, Japan, Dec. 16-19, 2009.

Comaniciu et al., "Mean Shift: A Robust Approach Toward Feature Space Analysis", IEEE Transactions on Pattern Analysis and Machine Intelligence, vol. 24, No. 4, pp. 603-619, May 2002.

Datar et al., "Locality-Sensitive Hashing Scheme Based on p-Stable Distributions" Proceedings of the Symposium on Computational Geometry, pp. 253-262, Brooklyn, USA, Jun. 9-11, 2004.

Dekker, L., "Building Symbolic Information for 3D Human Body Modeling from Range Data", Proceedings of the Second International Conference on 3D Digital Imaging and Modeling, IEEE computer Society, pp. 388-397, Ottawa, Canada, Oct. 4-8, 1999.

Holte et al., "Gesture Recognition using a Range Camera", Technical Report, Laboratory of Computer Vision and Media Technology, Aalborg University, Denmark, Feb. 2007.

Cheng et al., "Articulated Human Body Pose Inference from Voxel Data Using a Kinematically Constrained Gaussian Mixture Model", CVPR EHuM2: 2nd Workshop on Evaluation of Articulated Human Motion and Pose Estimation, Jun. 2007.

Nam et al., "Recognition of Hand Gestures with 3D, Nonlinear Arm Movements", Pattern Recognition Letters, vol. 18, No. 1, pp. 105-113, Elsevier Science B.V. 1997.

Segen et al., "Human-computer interaction using gesture recognition and 3D hand tracking", ICIP 98, Proceedings of the IEEE International Conference on Image Processing, vol. 3, pp. 188-192, Chicago, USA, Oct. 4-7, 1998.

Ascension Technology Corporation "Flock of Birds: Real-Time Motion Tracking", 2008.

Nesbat, S., "A System for Fast, Full-Text Entry for Small Electronic Devices", Proceedings of the 5th International Conference on Multimodal Interfaces, ICMI 2003, Vancouver, Canada, Nov. 5-7, 2003.

Bleiweiss et al., "Fusing Time-of-Flight Depth and Color for Real-Time Segmentation and Tracking", Editors R. Koch and A. Kolb: Dyn3D 2009, LNCS 5742, pp. 58-69, Springer-Verlag Berlin Heidelberg 2009.

Chinese Patent Application # 200780013930 Official Action dated Nov. 17, 2011.

Japanese Patent Application # 2009508667 Offical Action dated Nov. 24, 2011.

\* cited by examiner

DEPTH MAPPING WITH ENHANCED RESOLUTION

FIELD OF THE INVENTION

The present invention relates generally to methods and systems for three-dimensional (3D) mapping, and specifically to extraction of features from 3D map data.

BACKGROUND

A number of different methods and systems are known in the art for creating depth maps. In the present patent application and in the claims, the term "depth map" refers to a representation of a scene as a two-dimensional matrix of pixels, in which each pixel corresponds to a respective location in the scene and has a respective pixel depth value, indicative of the distance from a certain reference location to the respective scene location. In other words, the depth map has the form of an image in which the pixel values indicate topographical information, rather than brightness and/or color of the objects in the scene. The terms "depth map" and "3D map" are used herein interchangeably and have the same meaning.

Depth maps may be created, for example, by detection and processing of an image of an object onto which a pattern of spots is projected. In some such systems, the positions of the spots are uncorrelated in planes transverse to the projection beam axis. The positions are "uncorrelated" in the sense that the auto-correlation of the positions of the speckles in the pattern as a function of transverse shift is insignificant for any shift larger than the spot size. Random patterns, such as those created by primary laser speckle, are uncorrelated in this sense. Patterns created by human or computer design, such as pseudo-random and quasi-random patterns, may also be uncorrelated. Depth mapping methods using these sorts of projected patterns are described, for example, in PCT International Publications WO 2007/043036, WO 2007/105205, WO 2008/120217, and WO 2010/004542, whose disclosures are incorporated herein by reference.

Depth maps may be processed in order to segment and identify objects in the scene. Identification of humanoid forms (meaning 3D shapes whose structure resembles that of a human being) in a depth map, and changes in these forms from scene to scene, may be used as a means for controlling computer applications. For example, PCT International Publication WO 2007/132451, whose disclosure is incorporated herein by reference, describes a computer-implemented method in which a depth map is segmented so as to find a contour of a humanoid body. The contour is processed in order to identify a torso and one or more limbs of the body. An input is generated to control an application program running on a computer by analyzing a disposition of at least one of the identified limbs in the depth map.

As another example, U.S. Patent Application Publication 2011/0052006, whose disclosure is incorporated herein by reference, describes a method for processing a temporal sequence of depth maps of a scene containing a humanoid form. A digital processor processes at least one of the depth maps so as to find a location of the head of the humanoid form, and estimates dimensions of the humanoid form based on this location. The processor tracks movements of the humanoid form over the sequence using the estimated dimensions.

SUMMARY

Embodiments of the present invention provide improved methods, apparatus and software for extracting information from depth maps, and particularly information regarding structures having fine dimensions.

There is therefore provided, in accordance with an embodiment of the present invention, a method for depth mapping, which includes receiving an image of a pattern of spots that has been projected onto a scene, which includes a feature having a set of elongate appendages, which have respective transverse dimensions that are less than twice an average distance between the spots in the pattern that is projected onto the feature. The image is processed in order to segment and find a three-dimensional (3D) location of the feature. The spots appearing on the feature in the 3D location are connected in order to extract separate, respective contours of the appendages.

In some embodiments, the spots have respective positions in the pattern that are uncorrelated, and processing the image includes computing 3D coordinates of points on the feature based on transverse shifts of the spots in the image. The depth coordinates of the points on the feature may be found with a resolution finer than a depth increment corresponding to a transverse shift equal to the average distance between the spots in the image.

In a disclosed embodiment, connecting the spots includes delineating a respective contour of one of the appendages that has a transverse dimension that is less than the average distance between the spots in the pattern. Additionally or alternatively, connecting the spots includes delineating a respective contour of one of the appendages while no more than a single chain of the spots is connected along a length of the one of the appendages.

In a disclosed embodiment, the feature includes a hand, the appendages are fingers of the hand, and the extracted contours are indicative of a posture of the hand and fingers. The method may include detecting gestures of the hand, and controlling an application running on a computer responsively to the gestures.

In some embodiments, connecting the spots includes computing a first depth value that is characteristic of the feature and a second depth value that is characteristic of a background of the scene behind the feature, and sorting the spots in a vicinity of the feature in the image between the first and second depth values. Connecting the spots may include identifying in the image an area of shadow between the appendages, adding further points to the image in the area of the shadow, and assigning the second depth coordinate to the further points, and applying the further points in delineating the contours of the appendages.

In a disclosed embodiment, connecting the spots includes constructing a graph having vertices corresponding to the spots in the image, and identifying cut-edges of the graph in order to find the contours. Connecting the spots may include identifying features of the image in a vicinity of the appendages, and finding the features that correspond to the contours responsively to the graph.

There is also provided, in accordance with an embodiment of the present invention, apparatus for depth mapping, which includes an imaging assembly, which is configured to capture an image of a pattern of spots that has been projected onto a scene, which includes a feature having a set of elongate appendages, which have respective transverse dimensions that are less than twice an average distance between the spots in the pattern that is projected onto the feature. A processor is configured to process the image in order to segment and find a three-dimensional (3D) location of the feature and to connect the spots appearing on the feature in the 3D location in order to extract separate, respective contours of the appendages.

There is additionally provided, in accordance with an embodiment of the present invention, a computer software product, including a computer-readable medium in which program instructions are stored, which instructions, when read by a processor, cause the processor to receive a an image of a pattern of spots that has been projected onto a scene, which includes a feature having a set of elongate appendages, which have respective transverse dimensions that are less than twice an average distance between the spots in the pattern that is projected onto the feature, and to process the image in order to segment and find a three-dimensional (3D) location of the feature and to connect the spots appearing on the feature in the 3D location in order to extract separate, respective contours of the appendages.

The present invention will be more fully understood from the following detailed description of the embodiments thereof, taken together with the drawings in which:

DETAILED DESCRIPTION OF EMBODIMENTS

Overview

Figure 1:
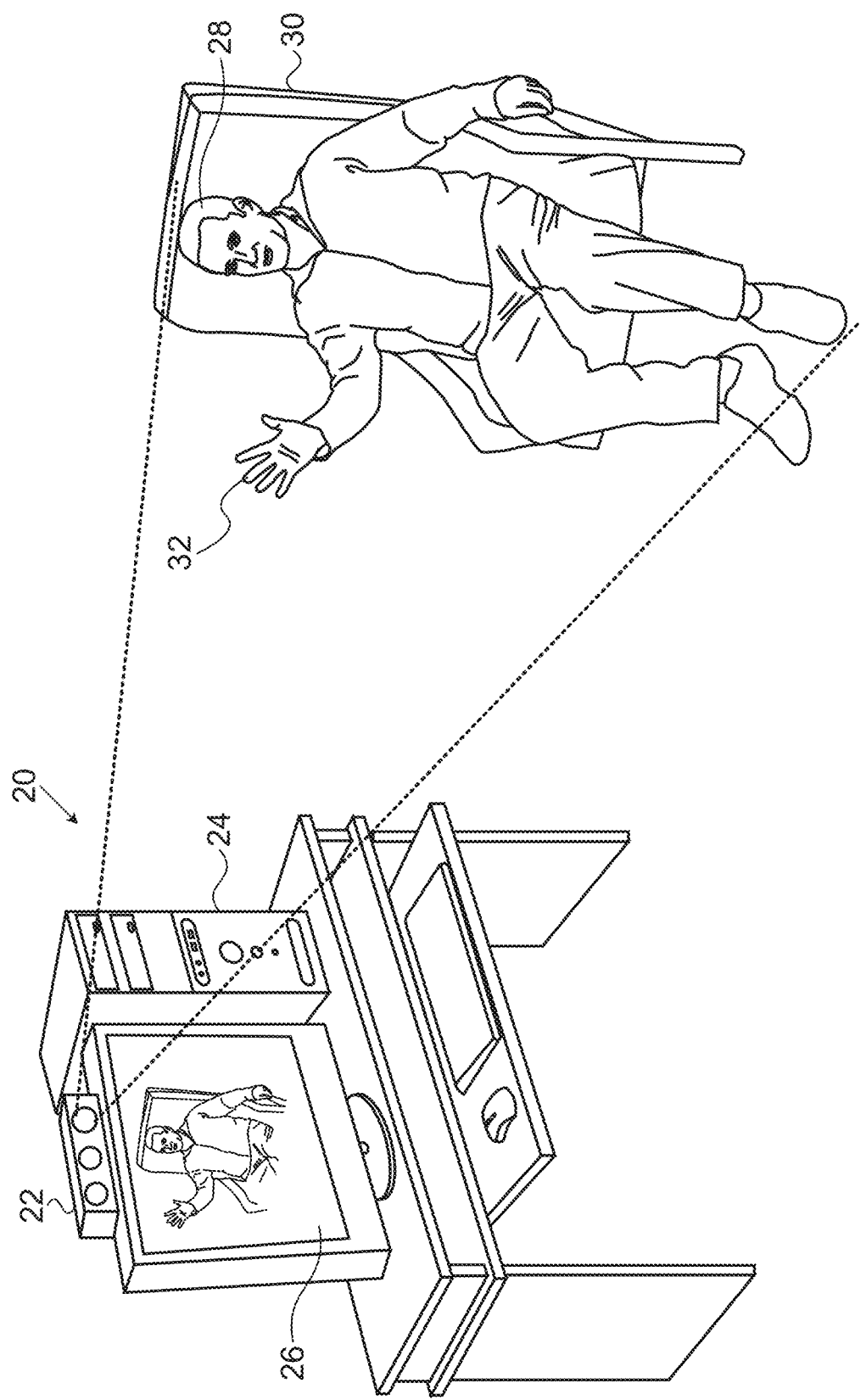
FIG. 1 is schematic, pictorial illustration of a depth mapping system, in accordance with an embodiment of the present invention.

Practical depth mapping systems that are known in the art, particularly compact, low-cost systems that are used in mass-market applications, generally have low spatial resolution. For example, in systems that extract depth coordinates by processing an image of a pattern of spots that is projected onto a scene, the resolution is determined generally by the size of and spacing between the spots, which are typically several times greater than the pixel size in the image. Typically, for robust, artifact-free depth mapping, the resolution can be no better than three or four times the spot spacing. As a result fine features of the scene that would be visible in a conventional gray scale or color image cannot be distinguished in the depth map.

As a result of these limitations, when a humanoid form is extracted from a depth map (using the techniques described in the above-mentioned WO 2007/132451 or US 2011/0052006, for example), the locations and postures of the arms and hands can generally be detected, but not the individual fingers. When the depth map is used as part of a 3D user interface, such as a gesture-based interface for a computer or entertainment console, the interface will respond only to gross gestures of the arms, hands and body. It would be desirable to enable such systems to detect and respond to finger gestures at the same time, but without adding substantially to the hardware complexity and cost of the system.

Embodiments of the present invention address use novel image processing techniques to enhance the resolution of depth mapping systems that operate by projecting and capturing an image of a spot pattern, so as to enable fine features to be extracted from a scene. These techniques take advantage of heuristic knowledge of the features that are to be extracted, and are specifically adapted to resolve features having a set of elongate appendages, such as the fingers of a hand. The disclosed techniques start by finding the 3D location of the feature of interest (such as the hand) in the depth map, and then systematically connect the spots appearing on the feature in order to extract separate, respective contours of the appendages (such as the fingers). These embodiments may be used, for example, to find the posture of the hand and fingers, and thus to detect gestures of the hand in order to control an application running on a computer.

The disclosed embodiments are capable of extracting these fine contours even when the respective transverse dimensions of the appendages (such as the widths of the fingers) are on the order of the average distance between the spots in the pattern that is projected onto the feature, i.e., when these transverse dimensions are less than twice the average distance, or even less than the actual average distance, between the spots. Typically, the contour of any one of the appendages can be found even when no more than a single chain of the spots is connected along the length of the appendage. In other words, the resolution of the contours found in these embodiments is considerably finer than the inherent resolution of the spot pattern itself.

System Description

FIG. 1 is a schematic, pictorial illustration of a 3D user interface system 20, in accordance with an embodiment of the present invention. The user interface is based on a 3D imaging assembly 22, which captures 3D scene information that includes at least a part of the body of a human user 28. The user in this example scenario is seated in a chair 30. Assembly 22 may also capture 2D color video images of the scene. Details of a 3D imaging assembly of this sort are described, for example, in the above-mentioned PCT International Publication WO 2010/004542.

Assembly 22 outputs a sequence of frames containing 3D map data (and possibly color image data, as well) to a computer 24, which extracts high-level information from the map data. This high-level information is provided via an Application Program Interface (API) to an application running on computer 24, which drives a display screen 26 accordingly. For example, user 28 may select and interact with content appearing on screen 26 by moving his arms and hands 32.

In one embodiment, assembly 22 projects a pattern of spots onto the scene and captures an image of the projected pattern.

Assembly 22 or computer 24 then computes the 3D coordinates of points in the scene (including points on the surface of the user's body) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from assembly 22. Methods and devices for this sort of triangulation-based 3D mapping using a projected pattern are described, for example, in the above-mentioned PCT International Publications WO 2007/043036, WO 2007/105205, WO 2008/120217 and WO 2010/004542.

Alternatively, system 20 may use other methods of 3D mapping that use projected spot patterns (which may be uncorrelated or possibly more regular grid-based patterns), such as stereoscopic imaging or time-of-flight measurements, based on single or multiple cameras or other types of sensors, as are known in the art.

In the embodiment shown in FIG. 1, system 20 captures and processes a temporal sequence of depth maps (also referred to as 3D maps) containing user 28. The user typically moves his body during this process. Software running on a digital processor in assembly 22 and/or computer 24 processes the 3D map data to extract geometrical features of the humanoid form corresponding to user 28. The software analyzes these geometrical features (as described in detail hereinbelow) in order to extract at least the upper-body pose of the user, which typically includes 3D locations and orientations of the user's shoulders, arm joints, hands and head. For this purpose, the software may, for example, apply techniques described in the above-mentioned U.S. Patent Application Publication 2011/0052006, as well as in U.S. patent application Ser. No. 13/461,802, filed May 2, 2013, whose disclosure is incorporated herein by reference.

After locating hand 32 of user 28 in the depth map, the software performs further processing to find the pose of the fingers of the hand, using the techniques that are described below. It may also analyze the trajectories of the hand and fingers over multiple frames in the sequence in order to identify gestures made by the user. The pose and gesture information are provided via the above-mentioned API to an application program running on computer 24. This program may, for example, move and modify images presented on display 26 in response to the pose and/or gesture information regarding the user hand (or hands) and fingers, as well as the arms and possibly the entire 3D skeleton.

Computer 24 typically comprises a general-purpose digital processor, which is programmed in software to carry out the functions described hereinbelow. The software may be downloaded to the processor in electronic form, over a network, for example, or it may, alternatively or additionally, be stored on tangible, non-transitory media, such as optical, magnetic, or electronic memory media. Further alternatively or additionally, at least some of the described functions of the computer may be implemented in dedicated hardware, such as a custom or semi-custom integrated circuit or a programmable gate array or digital signal processor (DSP). Although computer 24 is shown in FIG. 1, by way of example, as a separate unit from imaging assembly 22, some or all of the processing functions of the computer may be performed by a suitable microprocessor and software or by dedicated circuitry within the housing of the imaging assembly or otherwise associated with the imaging assembly.

As another alternative, at least some of these processing functions may be carried out by a suitable digital processor that is integrated with display screen (in a television set, for example) or with any other suitable sort of computerized device, such as a game console or media player. The sensing functions of assembly 22 may likewise be integrated into the computer or other computerized apparatus that is to be controlled by the sensor output. References in the description and the claims to a "processor" should thus be understood as referring to any and all processing configurations that may be used in implementing the methods described herein.

Figure 2:
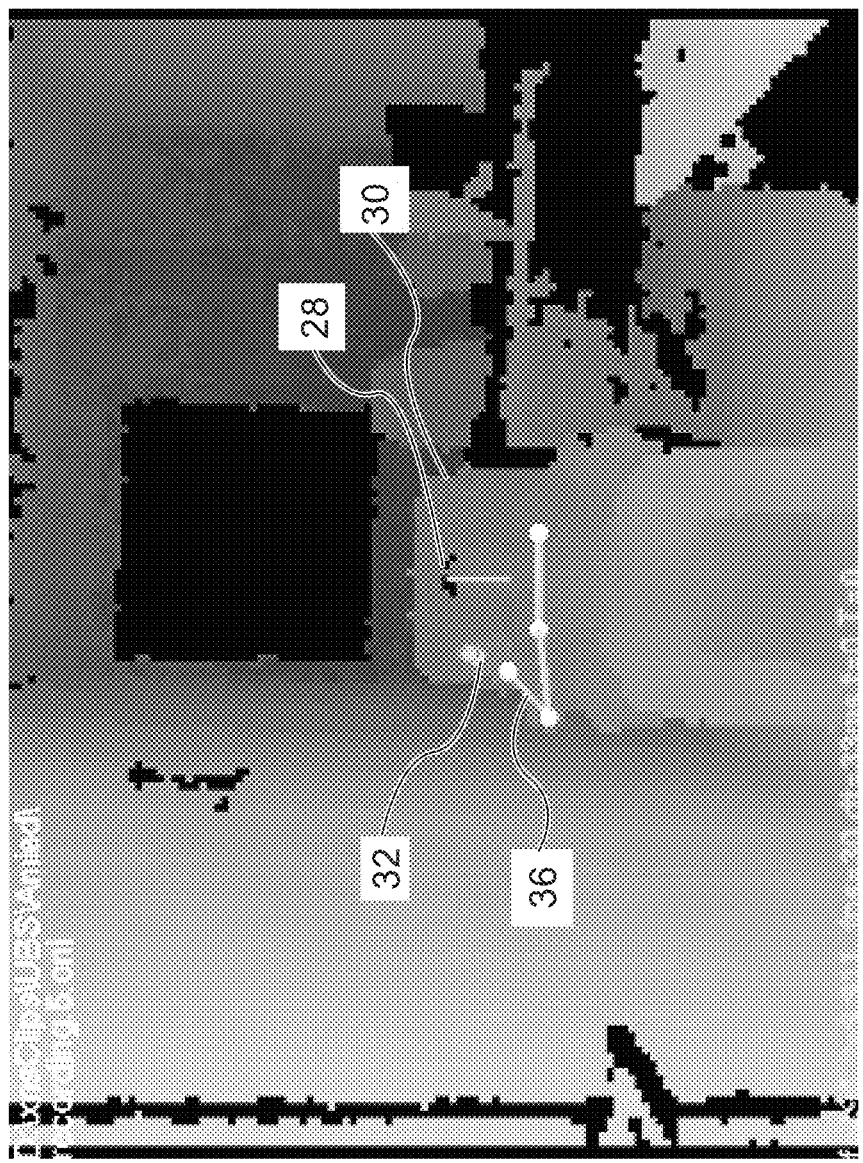
FIG. 2 is a schematic representation of a depth map that is captured and processed in a depth mapping system, in accordance with an embodiment of the present invention.

FIG. 2 is a schematic representation of a depth map captured by assembly 22, in accordance with an embodiment of the present invention. The depth map, as explained above, comprises a matrix of pixels having respective depth values. The depth values are represented in FIG. 2 as gray-scale values, with lighter shades of gray corresponding to smaller depth values, i.e., locations closer to assembly 22. (Black areas correspond to pixels for which no depth values could be determined.) In this particular scene, the depth values of user 28 blend into those of chair 30 on which the user is sitting.

Computer 24 processes this depth map, using the methods described in the above-mentioned U.S. patent application Ser. No. 13/461,802, for example, in order to segment and extract an upper body skeleton 36 of user 28. The skeleton is represented in FIG. 2 by a set of line segments connecting joints that correspond to the head, shoulders and one (or both) of the user's arms. The right arm represented in the figure culminates in the 3D location of hand 32, which is typically indicated by the joint locations and angles and the segment lengths of the extracted skeleton. Additionally or alternatively, the hand location may be found by tracking movements of the arm and hand over multiple successive depth frames captured by assembly 22. The 3D hand location is used in finding the contours of the user's fingers, as described below.

Methods for Extracting Finger Contours and Posture

Figure 3:
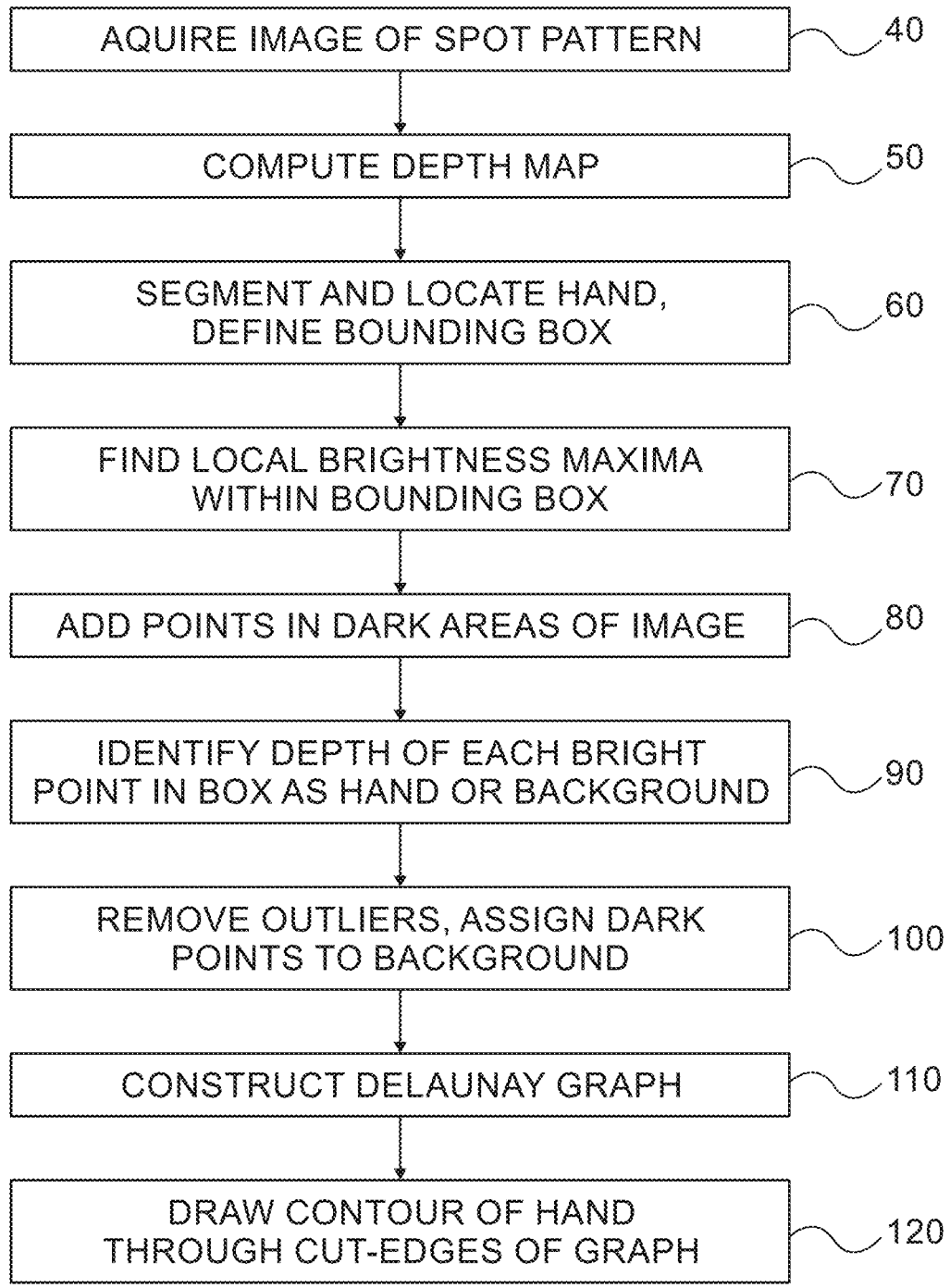
FIG. 3 is a flow chart that schematically illustrates a method for finding a contour of a hand in a depth map, in accordance with an embodiment of the present invention.

FIG. 3 is a flow chart that schematically illustrates a method for finding a contour of a hand and fingers in a depth map, in accordance with an embodiment of the present invention. For clarity and convenience, the method will be described here with reference to the components of system 20 and user 28, as illustrated in FIGS. 1 and 2. Alternatively, as noted earlier, the method of FIG. 3 may be applied in other sorts of depth mapping systems that use a projected pattern of spots in creating a depth map. The principles of this method may be applied not only in finding finger poses, as described below, but also in extracting the contours of other sorts of elongate appendages that might otherwise be beyond the 3D mapping resolution of the system in question.

The method of FIG. 3 begins with acquisition of an image of the spot pattern that is projected onto the scene containing user 28, at an image input step 40. It will be assumed that the image is a gray-scale image, although color images may also be processed in similar fashion. Assembly 22 and/or computer 24 processes this image in order to compute a depth map of the scene, at a depth map generation step 50. Computer 24 then segments and processes the depth map in order to find the location of hand 32, at a segmentation step 60. Steps 40, 50 and may be performed using any suitable techniques that are known in the art, such as the techniques that are described in the patent applications described above.

Figure 4:
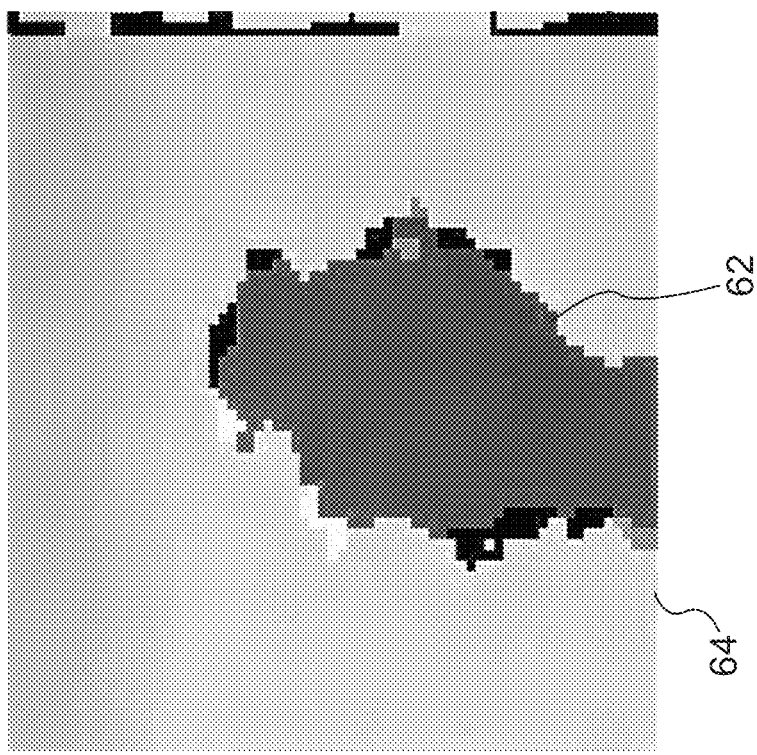
FIG. 4 is a schematic representation of a hand extracted from a depth map, in accordance with an embodiment of the present invention.

FIG. 4 is a schematic representation of a contour 62 of hand 32 that is extracted from a depth map at step 60, in accordance with an embodiment of the present invention. Once computer 24 has located the hand, it defines a bounding box 64 that contains the hand for further processing in order to find the contours of the fingers. These finger contours are much finer than the resolution of the depth map at this stage.

Figure 5:
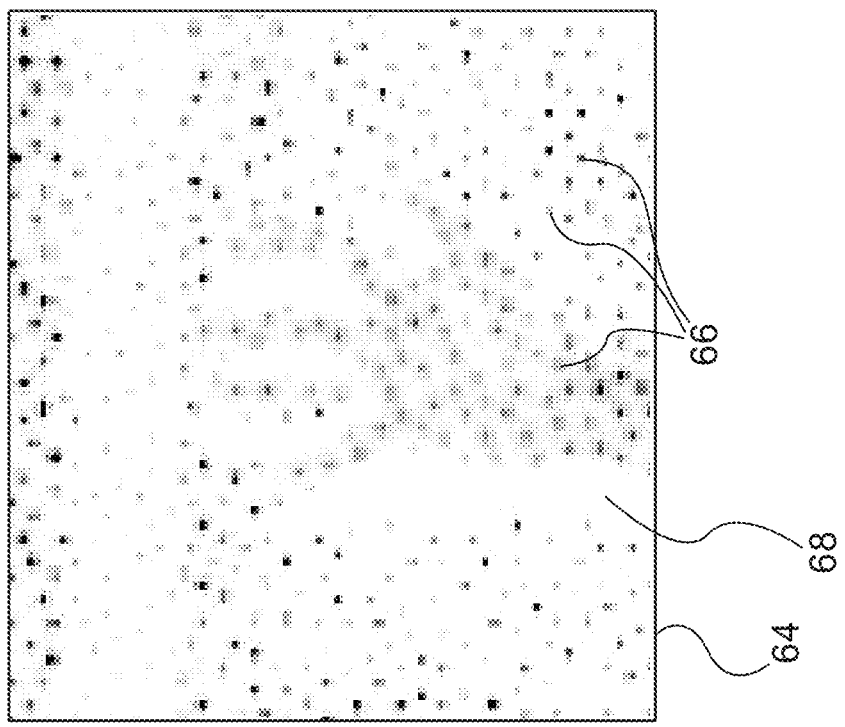
FIG. 5 is a schematic representation of an image of a pattern of spots that is projected onto an area of a scene containing the hand of FIG. 4, in accordance with an embodiment of the present invention.

FIG. 5 is a schematic representation of an image of the pattern of spots 66 within bounding box 64, in accordance with an embodiment of the present invention. The figure shows the part of the gray-scale image within the bounding box that is captured by assembly 22. For convenience of representation, the gray scale in this and subsequent figures is reversed, i.e., dark areas in the figure corresponding to bright spots, while white areas of the figure corresponding to dark areas of the actual image.

Spots 66 appear in the image both on the hand (which can be seen as a faint gray area in the image) and in the background area that is behind the hand in the actual scene. The widths of the fingers are on the order of the average distance between adjacent spots (which is equal to the inverse root of the density of spots per unit area in the projected pattern) and are considerably less than twice this average distance. There are no spots in the image of areas 68 of the background that fall within the shadow of the hand, and thus appear simply as dark areas in the image.

To find the finger contours using the depth and gray scale information illustrated in FIGS. 4 and 5, computer begins by finding the locations of spots 66 within bounding box 64, at a spot finding step 70 (FIG. 3). For this purpose, the computer may, for example, smooth the gray-scale image illustrated in FIG. 5 and then differentiate to find local brightness maxima corresponding to spots 66.

Figure 6:
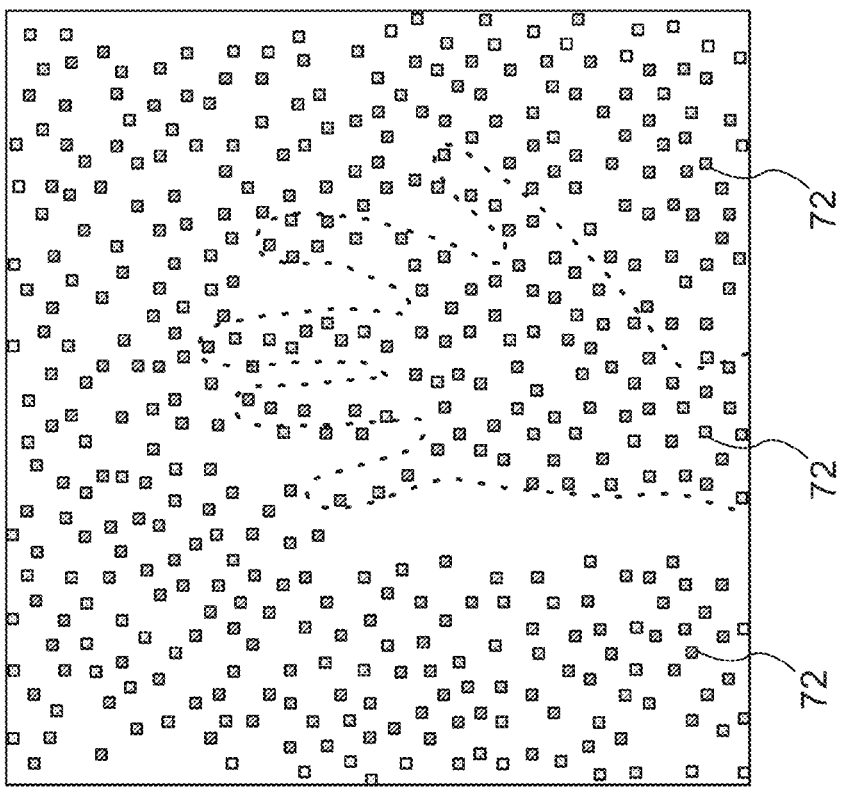

FIG. 6 is a schematic representation of the area of the image within bounding box 64 after marking of local brightness maxima 72 at step 70, in accordance with an embodiment of the present invention. The result at this stage is a binary map, in which local maxima have been marked without regard to whether they belong to hand 32 or to the background behind it. The outline of the hand is shown as a dotted line in this and subsequent figures as an aid to understanding, but the actual contour of the hand is not computed or otherwise known to computer 24 until the steps in the method of FIG. 3 have been completed.

Computer 24 uses the distribution of maxima 72 in FIG. 6 in order to identify and fill in shadow areas 68 of the image of FIG. 5, at a dark area processing step 80 (FIG. 3). For this purpose, for example, computer may use morphological image processing techniques: Brightness maxima 72 are gradually dilated to fill in the illuminated areas of the hand and background, and at the same time, the darkest pixels in the image, which typically fall within shadow areas 68, are dilated to fill in the shadow areas. This process continues until all pixels in the image have been assigned to either a bright or a dark area. The bright areas already contain maxima 72, corresponding to the locations of spots 66 in the projected pattern.

Computer 24 chooses and marks points at certain of the darkest pixels within the dark areas, as well, with a density that is approximately equal to the spot density. To ensure that the spaces between fingers appear clearly, the computer may use heuristic knowledge of the shape of the hand to identify these spaces and mark a sufficient number of points in the spaces. For example, the computer may draw radii extending from the wrist joint location provided at step 60, and may then identify radii passing through brightness maxima as fingers and other, neighboring radii passing through brightness minima as the spaces between the fingers.

Figure 7:
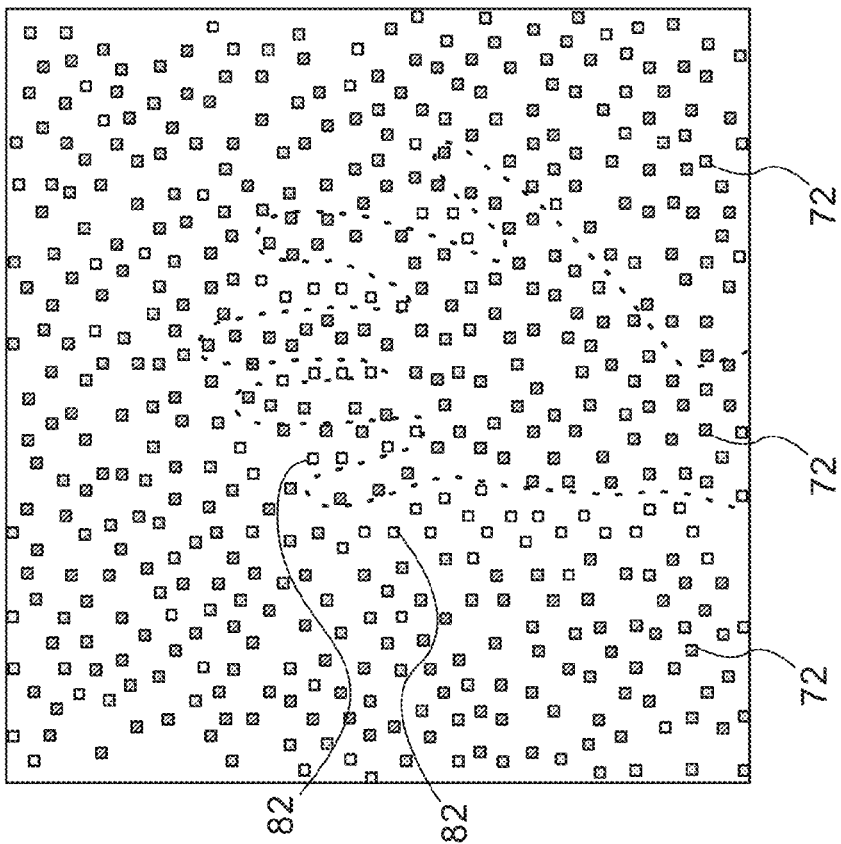
FIGS. 6-9 are schematic representations of the pattern of spots of FIG. 5, showing successive stages in processing of the pattern to extract a contour of the hand, in accordance with an embodiment of the present invention.

FIG. 7 is a schematic representation of the area of the image within bounding box 64 in which dark points 82 have been added at step 80, along with local brightness maxima 72 found at step 70, in accordance with an embodiment of the present invention.

For each brightness maximum 72 within bounding box 64, computer 24 finds a respective depth value, at a depth identification step 90 (FIG. 3). The depth values are determined at the depth resolution of the original depth map that was computed at step 50, at least as an initial estimate. Subsequently, using the techniques described below, the transverse dimensions of the hand (i.e., the dimensions within the plane of the image shown in FIG. 5), and possibly the depth dimensions, as well, are extracted with much finer resolution than the original depth map.

Step 90 can be simplified by assuming that only two depth values are possible within the bounding box: the depth that was computed for hand 28 (corresponding to contour 62 in FIG. 4) or the depth that was computed for the background area behind the hand. These representative depth values may be calculated, for example, as the respective centers-of-mass of the hand pixels and of the background pixels. Computer 24 thus sorts spots 66 as belonging either to the hand depth or the background depth.

One way to find the depth values at step 90 is by a simplified cross-correlation computation. In preparation for this computation, computer 24 prepares two reference images of the projected spot pattern, one with a transverse shift corresponding to the depth value of the hand and the other with a transverse shift corresponding to the depth value of the background. (The transverse shift varies with depth due to parallax between the pattern projector and image capture device in assembly 22, as explained in the above-mentioned PCT publications.) Computer 24 then computes the cross-correlation value between a group of pixels in the gray-scale image of the projected spot pattern (FIG. 5) at the location of each brightness maximum 72 and corresponding groups of pixels in each of the two reference images at the same location. Since there are only two possible depth values, it is sufficient to compute the cross-correlation at this step over only a small matrix of pixels (for example, a 3×3 matrix) at each location, and the computation can therefore be completed quickly and easily. Each brightness maximum 72 is thus assigned a depth value corresponding to the reference image—either hand depth or background depth—that gave the higher correlation value for the location of the given brightness maximum.

In an alternative embodiment, computer 24 may find the depth values at step 90 with finer resolution than the original depth map. For this purpose, multiple "stable" depth values may be identified initially within the bounding box, for both the hand and the background. A "stable" value may be defined, for example, as a depth value that is consistent over a number of neighboring locations, and these locations are defined as "stable" locations. Different parts of the hand may have different stable depths, and similarly different parts of the background may have different stable depths, particularly when the background is not simply a uniform plane. The depth value at each point is then found precisely, by cross-correlation computation, for example, using the stable depth value at the nearest stable location as a starting point.

In this manner, the computer is able to calculate depth values with resolution finer than the depth increment corresponding to a transverse shift equal to the average distance between the spots in the projected pattern. Furthermore, stable depth values and locations may be used to extract hand postures (and other 3D shapes) from a depth map even without prior segmentation and identification of the arm humanoid form to which the hand belongs.

Figure 8:
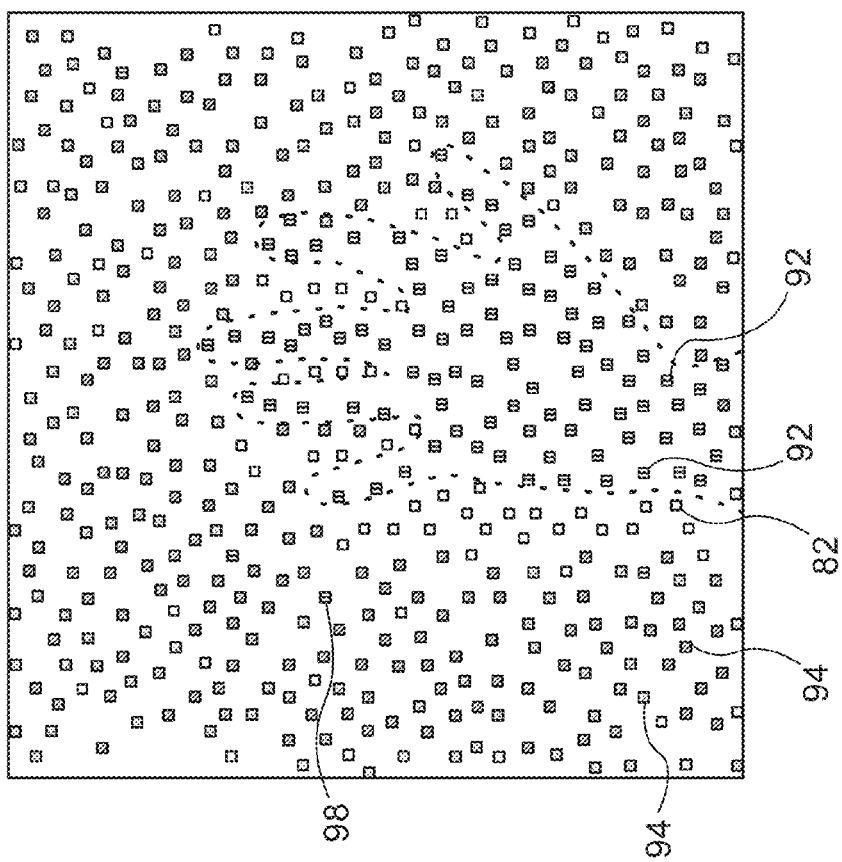

FIG. 8 is a schematic representation of the area of the image within bounding box 64, in which the local brightness maxima have been respectively identified as hand points 92 or background points 94 in accordance with an embodiment of the present invention. Dark points 82 remain unassigned at this stage. Although most of the brightness maxima are correctly assigned in FIG. 8, some artifacts may still remain, such as outlier locations 98 at which the correlation computation of step 90 gave an incorrect value.

Computer 24 corrects possible artifacts in the map of FIG. 8, at a global optimization step 100 (FIG. 3). At this step, the computer typically identifies outlier locations 98 and changes their respective depth values to the "correct" value at each point. The computer then assigns dark points 82 to be part of the background, i.e., it arbitrarily (but correctly, from a heuristic perspective) assigns the depth value of the background to these dark points.

To correct artifacts due to outliers at step 100, for example, the computer may construct connected components of background points 94 and may then identify presumed hand points, such as location 98, that cut these connected components. By the same token, the computer may identify presumed background points that cut connected components of hand points 92. For each such cutting point, the computer may compute a score based, for example, on the geometrical isolation of this point from other points of the presumably same depth, as well as on the correlation values for the cutting point and its neighboring points that were computed at step 90. The computer may then change the depth value of cutting points whose (high) score indicates that their depth values are probably erroneous. To construct the connected components and identify cutting points, the computer may construct and use a graph over points 92 and 94, such as the sort of graph that is described below at step 110.

Figure 9:
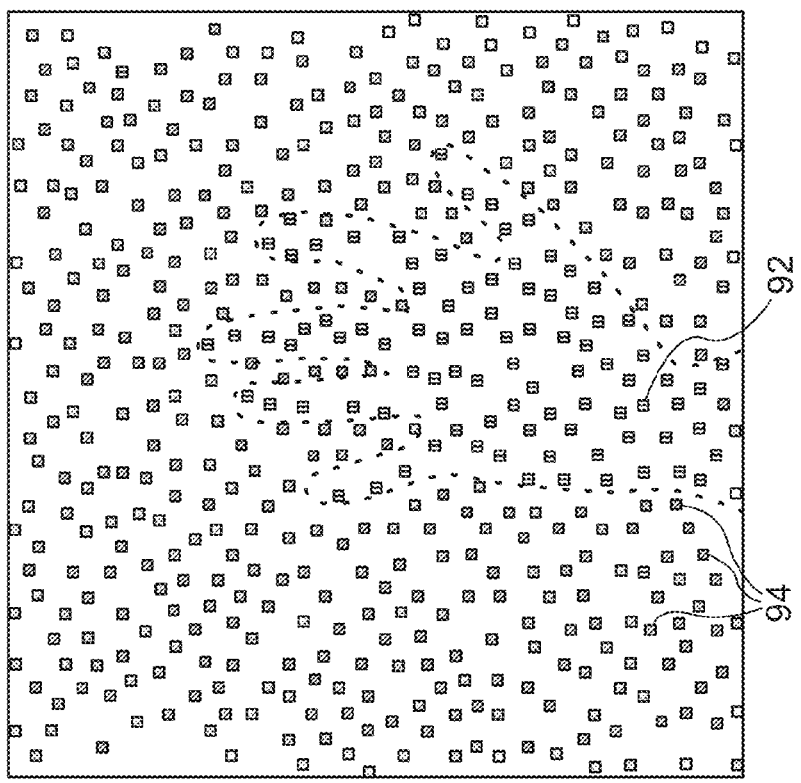

FIG. 9 is a schematic representation of the map of FIG. 8, following artifact removal and processing of shadow areas at step 100, in accordance with an embodiment of the present invention. Obvious outliers have been removed, and dark points 82 have been converted to background points 94, as described above.

To extract the hand contour from the map of FIG. 9, computer 24 constructs a graph having points 92 and 94 as vertices, at a graph construction step 110 (FIG. 3). A triangular Delaunay graph may be used for this purpose. (If such a graph was created previously for the connected component analysis at step 100, the same graph may be reused at step 110.) A Delaunay graph over a set of points P in a plane is a triangulation DT(P) such that no point in P falls inside the circumscribed circle of any triangle in DT(P). Various algorithms are known in the art for constructing a Delaunay graph, and any suitable algorithm may be used for this purpose at step 110.

Figure 10:
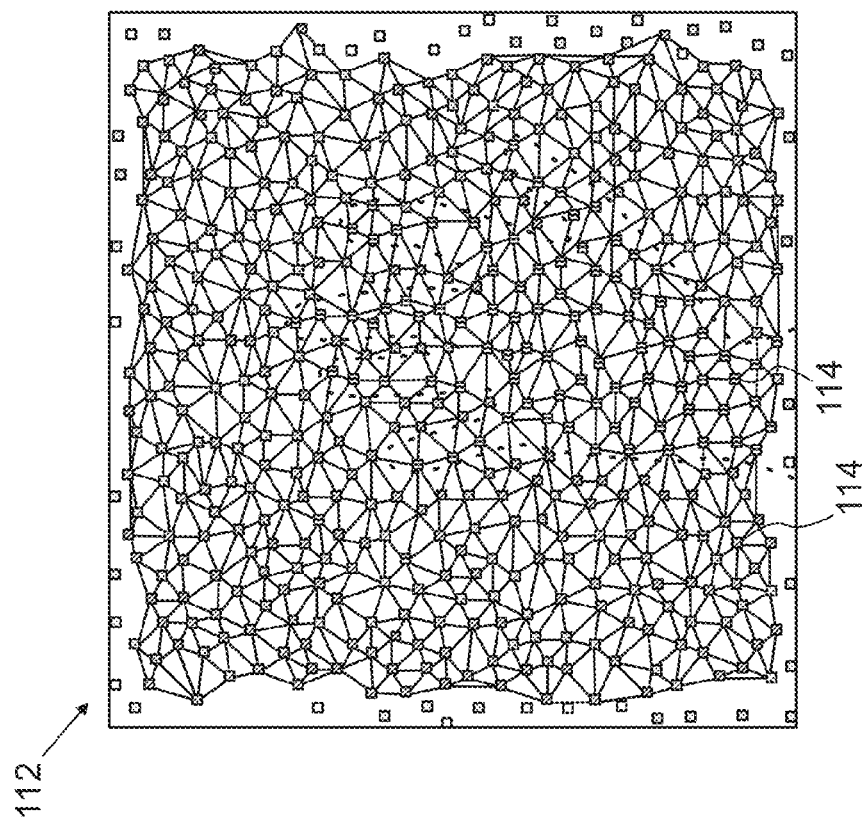
FIG. 10 is a schematic representation of a Delaunay graph having the spots of FIG. 9 as vertices, in accordance with an embodiment of the present invention.

FIG. 10 is a schematic representation of a Delaunay graph 112 having the spots of FIG. 9 as vertices 114, in accordance with an embodiment of the present invention.

Computer 24 extracts the contour of hand 32, and specifically of the fingers of the hand, from graph 112, at a contour extraction step 120 (FIG. 3). For this purpose, the computer may find cut-edges of the graph, i.e., edges that connect a hand point 92 to a background point 94. These cut-edges are presumed to cross the contour of the hand or fingers. The computer thus concludes that the contour passes through the cut-edges and draws the contour by choosing a point on each cut-edge, sorting the edges, and then connecting the neighboring points.

Figure 11:
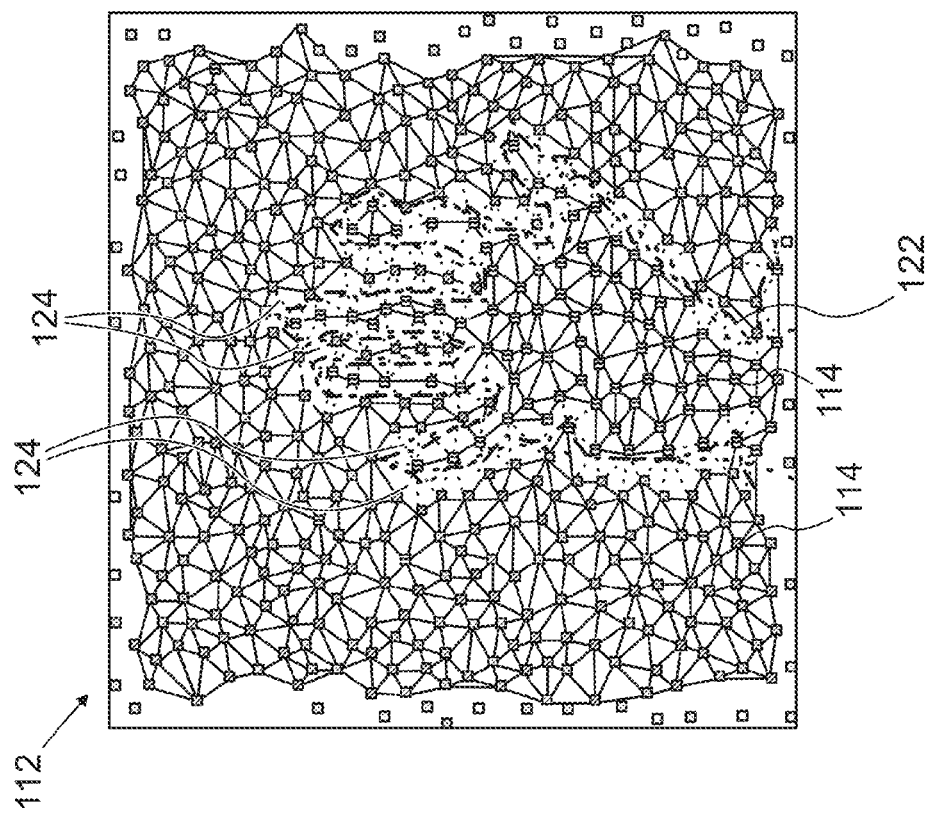
FIG. 11 is a schematic representation of the graph of FIG. 10 showing a contour of a hand that is extracted from the graph, in accordance with an embodiment of the present invention.

FIG. 11 is a schematic representation of graph 112, showing extraction of a contour 122 of hand 32 from the graph, in accordance with an embodiment of the present invention. Cut-edges 124 each connect one vertex 114 corresponding to a hand point 92 to another vertex corresponding to a background point 94. These cut-edges 124 are shown in the figure as dashed lines, through which contour 122 runs. In the example shown in FIG. 11, only a single chain of vertices 114 (corresponding to a single chain of spots 66 in the original image of FIG. 5) is connected along the length of each of the fingers. In other words, the resolution of contour 122 is actually finer than the resolution of the spot pattern on which the depth map is based.

It is possible simply to draw contour 122 through the centers of the successive cut edges and to derive a reasonable approximation of the hand and finger posture in this manner. Alternatively, for greater accuracy, graph 112 may be overlaid on the original gray-scale image (as in FIG. 5) from which the graph was derived, and the location of the contour at each cut-edge may be extracted using features of the gray-scale image. For example, the gray-scale image may be differentiated to find image edges that pass through the cut-edges of the graph, and contour 122 may be drawn along these image edges; or the contour may be considered to cross each cut-edge at the point along the cut-edge at which the gray-scale value of the image passes a given threshold. Alternatively or additionally, if a color image is registered with the depth map, information from the color image may be used in drawing contour 122.

Alternatively or additionally, the contour may be found accurately by identifying the fingertips and the bases of the fingers, and then drawing the contour between them based on the assumption of smoothness. The computer may find the fingertips and bases by extending radii from the wrist, as explained above: The fingertips will be the bright points farthest from the wrist along respective radii, while the finger bases will be the dark points nearest to the wrist along intervening radii. Based on these points and the assumption of smoothness, the computer stretches the contour to find the shortest path that passes through the contour edges. Gradient descent methods may be applied, for example, in finding the optimal contour. Using this method, the computer can achieve a resolution that is even finer than the resolution of the image of the projected pattern itself.

Figure 12:
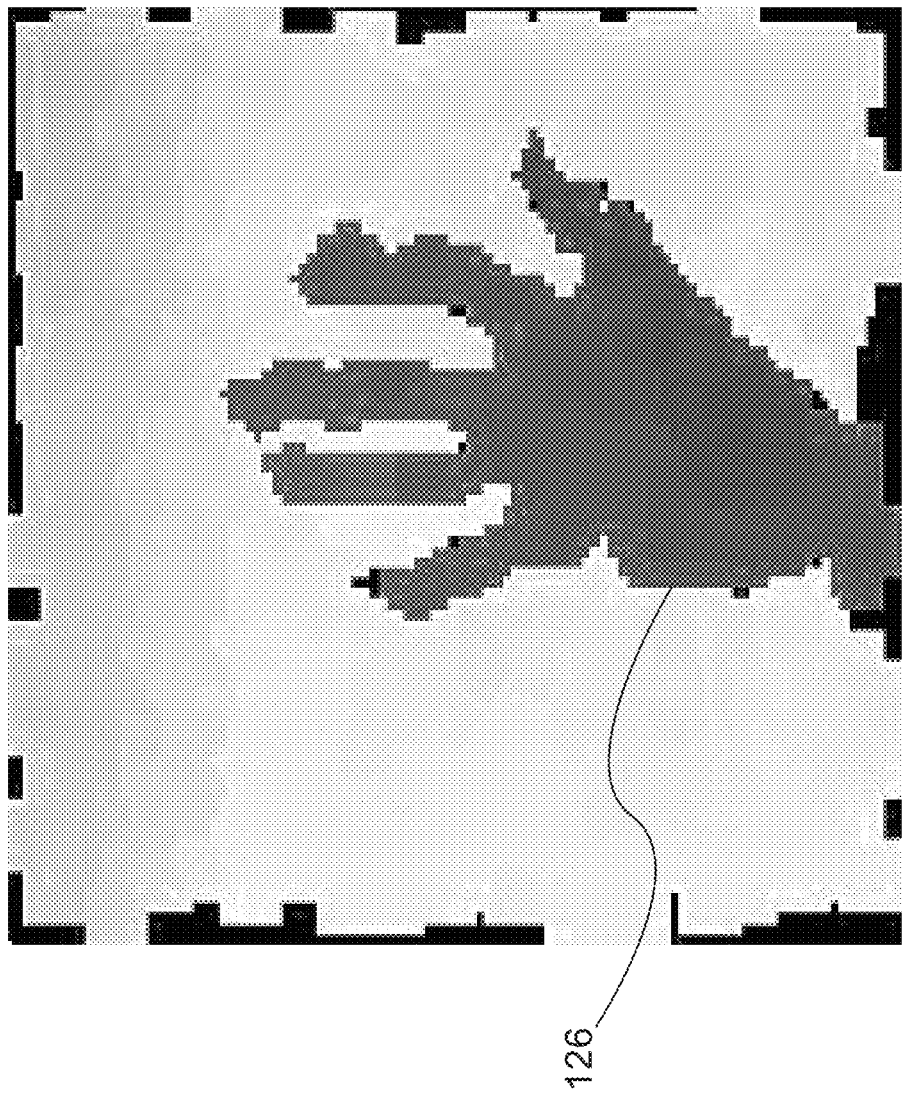
FIG. 12 is a schematic illustration of an image of the hand formed by the contour of FIG. 11, in accordance with an embodiment of the present invention.

FIG. 12 is a schematic illustration of an image 126 of hand 32 that is formed by the contour of FIG. 11, in accordance with an embodiment of the present invention. Despite minor artifacts remaining in the image, the contours and posture of the fingers are clearly delineated.

Although the functions performed by computer 24 at some steps in the method of FIG. 3 are described above, for the sake of clarity and completeness, in terms of certain specific algorithms, other algorithms that are known in the art of image processing may be applied to similar effect in order to carry out the steps of the method, and such alternative implementations are considered to be within the scope of the present invention. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for depth mapping, comprising:
   receiving in a digital processor an image of a pattern of spots that has been projected onto a scene, which includes a feature having a set of elongate appendages, which have respective transverse dimensions that are less than twice an average distance between the spots in the pattern that is projected onto the feature;

processing the image in order to segment and find a three-dimensional (3D) location of the feature; and connecting the spots appearing on the feature in the 3D location in order to extract separate, respective contours of each of the elongate appendages in the set.

2. The method according to claim 1, wherein the spots have respective positions in the pattern that are uncorrelated, and wherein processing the image comprises computing 3D coordinates of points on the feature based on transverse shifts of the spots in the image.

3. The method according to claim 2, wherein connecting the spots comprises finding depth coordinates of the points on the feature with a resolution finer than a depth increment corresponding to a transverse shift equal to the average distance between the spots in the image.

4. The method according to claim 1, wherein connecting the spots comprises delineating a respective contour of one of the appendages that has a transverse dimension that is less than the average distance between the spots in the pattern.

5. The method according to claim 1, wherein connecting the spots comprises delineating a respective contour of one of the appendages while no more than a single chain of the spots is connected along a length of the one of the appendages.

6. The method according to claim 1, wherein the feature includes a hand, and wherein the appendages are fingers of the hand.

7. The method according to claim 6, wherein the extracted contours are indicative of a posture of the hand and fingers, and wherein the method comprises detecting gestures of the hand, and controlling an application running on a computer responsively to the gestures.

8. The method according to claim 1, wherein connecting the spots comprises computing a first depth value that is characteristic of the feature and a second depth value that is characteristic of a background of the scene behind the feature, and sorting the spots in a vicinity of the feature in the image between the first and second depth values.

9. The method according to claim 8, wherein connecting the spots comprises:

identifying in the image an area of shadow between the appendages;

adding further points to the image in the area of the shadow, and assigning the second depth coordinate to the further points; and applying the further points in delineating the contours of the appendages.

10. The method according to claim 1, wherein connecting the spots comprises constructing a graph having vertices corresponding to the spots in the image, and identifying cut-edges of the graph in order to find the contours.

11. The method according to claim 10, wherein connecting the spots comprises identifying features of the image in a vicinity of the appendages, and finding the features that correspond to the contours responsively to the graph.

12. Apparatus for depth mapping, comprising:

an imaging assembly, which comprises a sensor that is configured to capture an image of a pattern of spots that has been projected onto a scene, which includes a feature having a set of elongate appendages, which have respective transverse dimensions that are less than twice an average distance between the spots in the pattern that is projected onto the feature; and a processor, which is configured to process the image in order to segment and find a three-dimensional (3D) location of the feature and to connect the spots appearing on the feature in the 3D location in order to extract separate, respective contours of each of the elongate appendages in the set.

13. The apparatus according to claim 12, wherein the spots have respective positions in the pattern that are uncorrelated, and wherein the processor is configured to compute 3D coordinates of points on the feature based on transverse shifts of the spots in the image.

14. The apparatus according to claim 13, wherein the processor is configured to find depth coordinates of the points on the feature with a resolution finer than a depth increment corresponding to a transverse shift equal to the average distance between the spots in the image.

15. The apparatus according to claim 12, wherein the processor is configured to delineate a respective contour of one of the appendages that has a transverse dimension that is less than the average distance between the spots in the pattern.

16. The apparatus according to claim 12, wherein the processor is configured to delineate a respective contour of one of the appendages while no more than a single chain of the spots is connected along a length of the one of the appendages.

17. The apparatus according to claim 12, wherein the feature includes a hand, and wherein the appendages are fingers of the hand.

18. The apparatus according to claim 17, wherein the extracted contours are indicative of a posture of the hand and fingers, and wherein the processor is configured to detect gestures of the hand based on the extracted contours, and to control an application running on a computer responsively to the gestures.

19. The apparatus according to claim 12, wherein the processor is configured to compute a first depth value that is characteristic of the feature and a second depth value that is characteristic of a background of the scene behind the feature, and to sort the spots in a vicinity of the feature in the image between the first and second depth values.

20. The apparatus according to claim 19, wherein the processor is configured to identify in the image an area of shadow between the appendages, to add further points to the image in the area of the shadow, to assign the second depth coordinate to the further points, and to apply the further points in delineating the contours of the appendages.

21. The apparatus according to claim 12, wherein the processor is configured to construct a graph having vertices corresponding to the spots in the image, and to identify cut-edges of the graph in order to find the contours.

22. The apparatus according to claim 21, wherein the processor is configured to identify features of the image in a vicinity of the appendages, and to find the features that correspond to the contours responsively to the graph.

23. A computer software product, comprising a non-transitory computer-readable medium in which program instructions are stored, which instructions, when read by a processor, cause the processor to receive an image of a pattern of spots that has been projected onto a scene, which includes a feature having a set of elongate appendages, which have respective transverse dimensions that are less than twice an average distance between the spots in the pattern that is projected onto the feature, and to process the image in order to segment and find a three-dimensional (3D) location of the feature and to connect the spots appearing on the feature in the 3D location in order to extract separate, respective contours of each of the elongate appendages in the set.

24. The product according to claim 23, wherein the spots have respective positions in the pattern that are uncorrelated, and wherein the instructions cause the processor to compute 3D coordinates of points on the feature based on transverse shifts of the spots in the image.

25. The product according to claim 24, wherein the instructions cause the processor to find depth coordinates of the points on the feature with a resolution finer than a depth increment corresponding to a transverse shift equal to the average distance between the spots in the image.

26. The product according to claim 23, wherein the instructions cause the processor to delineate a respective contour of one of the appendages that has a transverse dimension that is less than the average distance between the spots in the pattern.

27. The product according to claim 23, wherein the instructions cause the processor to delineate a respective contour of one of the appendages while no more than a single chain of the spots is connected along a length of the one of the appendages.

28. The product according to claim 23, wherein the feature includes a hand, and wherein the appendages are fingers of the hand.

29. The product according to claim 28, wherein the extracted contours are indicative of a posture of the hand and fingers, and wherein the instructions cause the processor to detect gestures of the hand based on the extracted contours, and to control an application running on a computer responsively to the gestures.

30. The product according to claim 23, wherein the instructions cause the processor to compute a first depth value that is characteristic of the feature and a second depth value that is characteristic of a background of the scene behind the feature, and to sort the spots in a vicinity of the feature in the image between the first and second depth values.

31. The product according to claim 30, wherein the instructions cause the processor to identify in the image an area of shadow between the appendages, to add further points to the image in the area of the shadow, to assign the second depth coordinate to the further points, and to apply the further points in delineating the contours of the appendages.

32. The product according to claim 23, wherein the instructions cause the processor to construct a graph having vertices corresponding to the spots in the image, and to identify cut-edges of the graph in order to find the contours.

33. The product according to claim 32, wherein the instructions cause the processor to identify features of the image in a vicinity of the appendages, and to find the features that correspond to the contours responsively to the graph.

* * * * *